United States Patent
Stray et al.

(10) Patent No.: US 7,560,690 B2
(45) Date of Patent: Jul. 14, 2009

(54) SYSTEM FOR DELIVERY OF A TRACER IN FLUID TRANSPORT SYSTEMS AND USE THEREOF

(75) Inventors: Helge Stray, Hagan (NO); Øyvind Dugstad, Hagan (NO); Sindre Hassfjell, Baerums verk (NO)

(73) Assignee: Resman AS, Trondheim (NO)

( * ) Notice: Subject to any disclaimer, the term of this patent is extended or adjusted under 35 U.S.C. 154(b) by 0 days.

(21) Appl. No.: 11/628,599

(22) PCT Filed: Jun. 30, 2005

(86) PCT No.: PCT/NO2005/000245

§ 371 (c)(1),
(2), (4) Date: Feb. 8, 2007

(87) PCT Pub. No.: WO2006/004426

PCT Pub. Date: Jan. 12, 2006

(65) Prior Publication Data

US 2007/0241277 A1 Oct. 18, 2007

(30) Foreign Application Priority Data

Jun. 30, 2004 (NO) .................................. 20042763

(51) Int. Cl.
G21H 5/02 (2006.01)
(52) U.S. Cl. ..................................................... 250/303
(58) Field of Classification Search .................. 250/303
See application file for complete search history.

(56) References Cited

U.S. PATENT DOCUMENTS

| | | | | |
|---|---|---|---|---|
| 582,147 A | * | 5/1897 | Riley | 213/176 |
| 3,960,001 A | * | 6/1976 | Hayes | 73/40.7 |
| 4,107,283 A | * | 8/1978 | Pratt et al. | 424/1.37 |
| 5,320,967 A | * | 6/1994 | Avallone et al. | 436/50 |
| 6,279,656 B1 | | 8/2001 | Sinclair et al. | |
| 6,645,769 B2 | | 11/2003 | Tayebi et al. | |
| 7,135,231 B1 | * | 11/2006 | Sinclair et al. | 428/407 |
| 2001/0036667 A1 | * | 11/2001 | Tayebi et al. | 436/56 |
| 2002/0020527 A1 | | 2/2002 | Kilaas et al. | |
| 2002/0134587 A1 | * | 9/2002 | Rester et al. | 175/48 |
| 2002/0187510 A1 | * | 12/2002 | Tachikawa et al. | 435/7.1 |
| 2003/0006036 A1 | * | 1/2003 | Malone et al. | 166/250.12 |
| 2003/0032562 A1 | | 2/2003 | Crossman et al. | |

* cited by examiner

Primary Examiner—David P Porta
Assistant Examiner—Kiho Kim
(74) Attorney, Agent, or Firm—Frommer Lawrence & Haug LLP; Ronald R Santucci

(57) ABSTRACT

The present application describes a specific tracer delivery system that has been tested. The claimed system is composed of melamine formaldehyde resin (MFR) doped with various tracer materials. The MFR is used to slowly release tracer compounds into a liquid system. The MFR/tracer mixture is applied as part of a monitoring system where tracer is delivered from the MFR/tracer mixture at a specific location up-stream and detected at some location downstream, thereby verifying fluid flow from that specific location up-stream. The MFR can be doped with different types of tracers, thereby allowing placement of different tracers at several different positions upstream. Production from the various labelled zones can be verified through the analysis of one sample downstream.

14 Claims, 4 Drawing Sheets

Experimental set-up for tracer release experiment

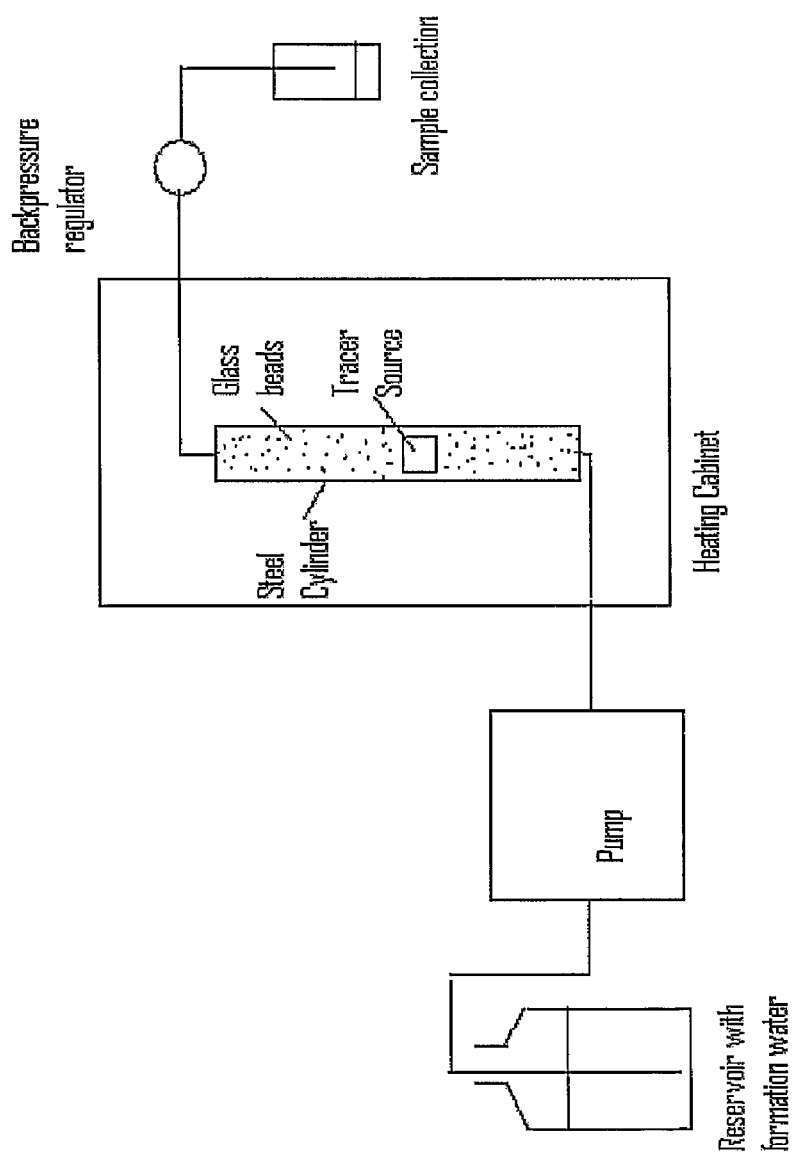
Figure 1 Experimental set-up for tracer release experiment

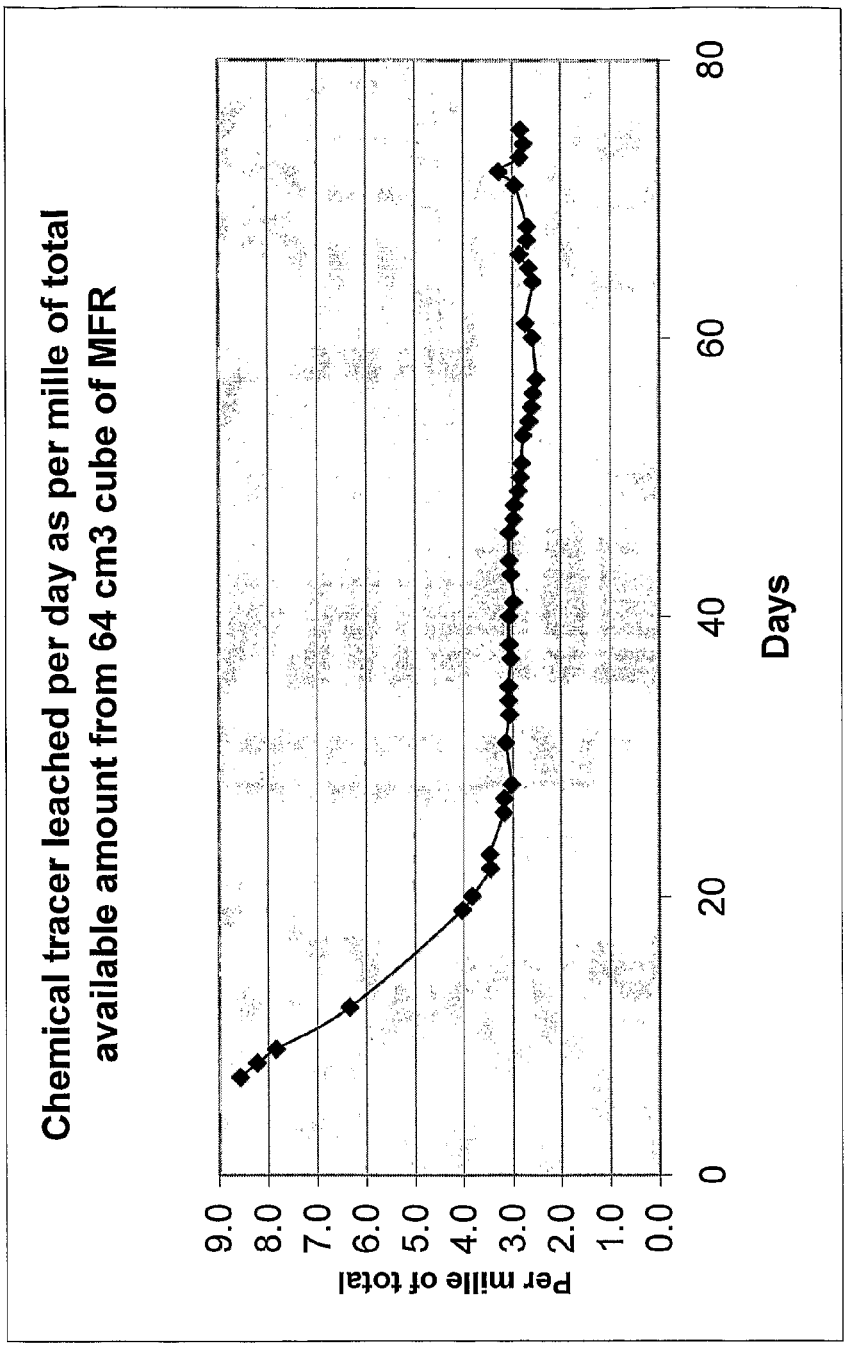
Figure 2. Amount of tracer leached per day from the 64 cm³ cube of MFR resin with 10% tracer, expressed as per mille of total available amount at start of experiment as function of time

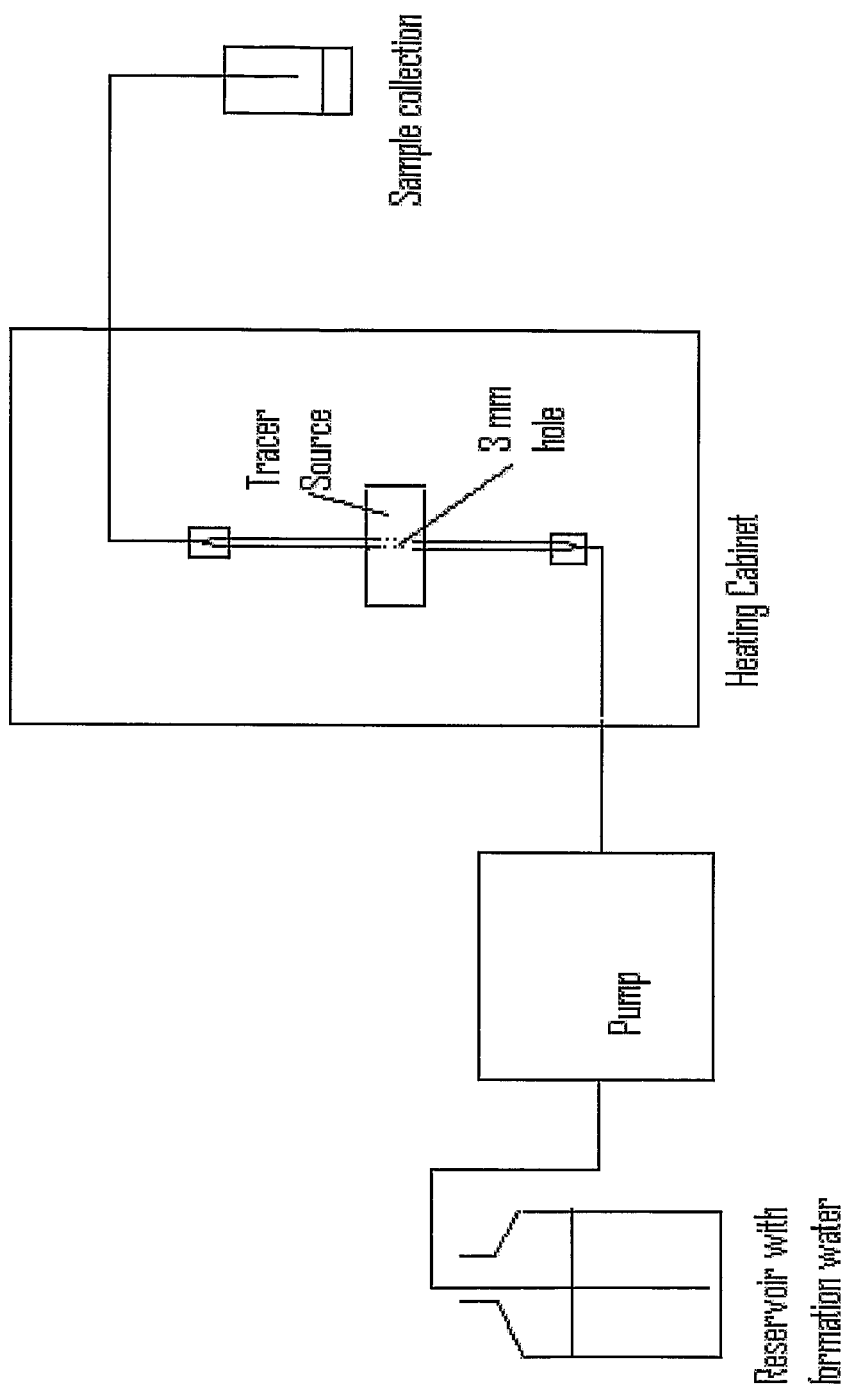
Figure 3. Experimental set-up for tracer release from MFR with formation water flowing through a hole in the resin

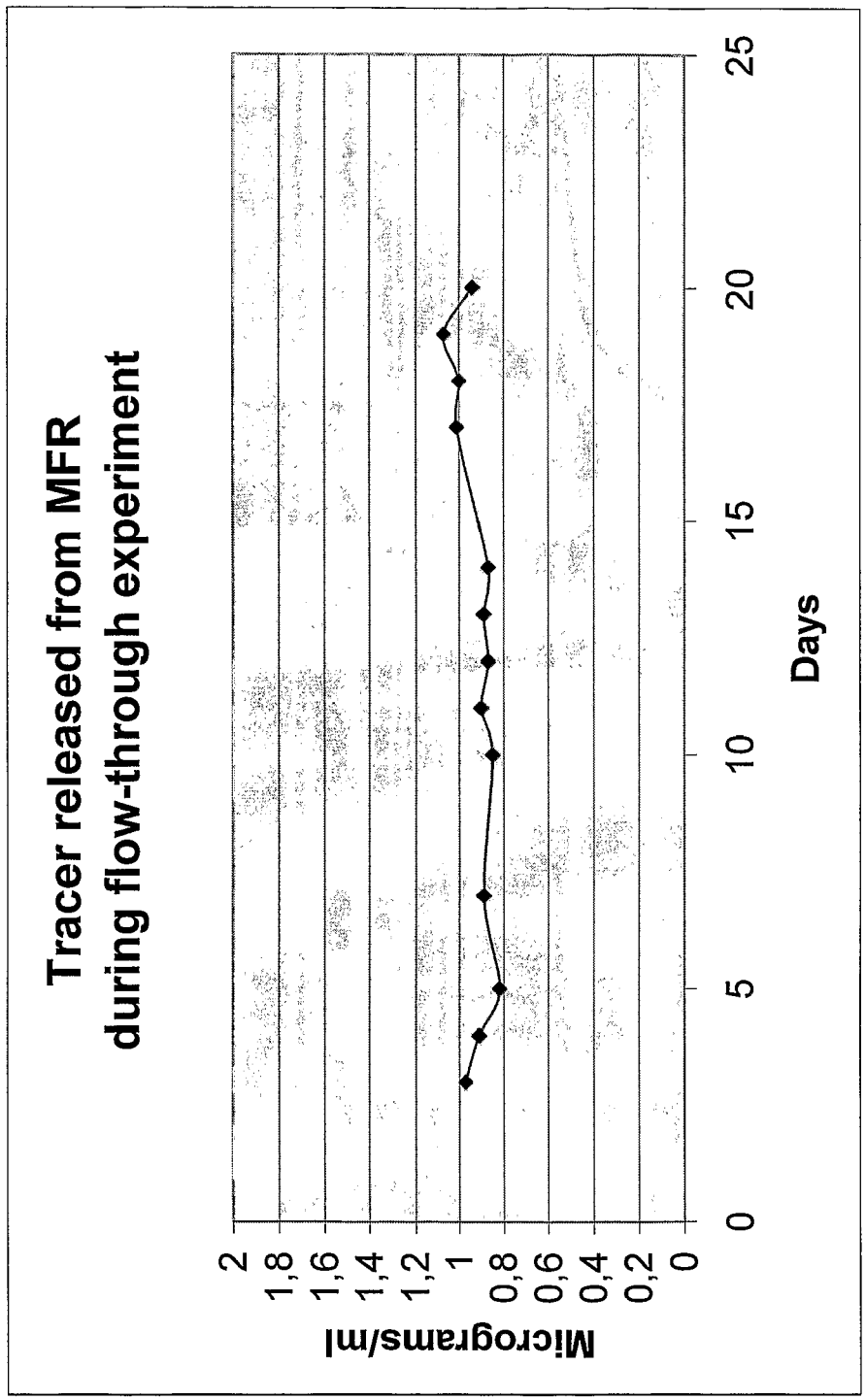
Figure 4. Release rate of tracer from MFR during flow-through experiment

SYSTEM FOR DELIVERY OF A TRACER IN FLUID TRANSPORT SYSTEMS AND USE THEREOF

This application is a 371 of PCT/NO2005/000245 filed on Jun. 30, 2005, published on Jan. 12, 2006 under publication number WO 2006/004426 A1 which claims priority benefits from Norwegian Patent Application Number 2004 2763 filed Jun. 30, 2004.

FIELD OF THE INVENTION

The present invention relates to a specific tracer delivery system composed of a melamine formaldehyde resin (MFR) doped with various tracer materials. The MFR/tracer mixture is used as part of a monitoring system where tracer is delivered from the MFR/tracer mixture at a specific location upstream and detected at some location downstream, thereby verifying fluid flow from that specific location upstream. The system is intended for long-term monitoring of fluid inflow in production wells in oil reservoirs.

BACKGROUND OF THE INVENTION

Tracers are used to follow fluid flow in various systems such as oil reservoirs, process flow lines, ground water is leakage studies etc. Tracers are released up-stream and detected downstream. Analysing tracer concentration downstream may give information about flow rates, dilution volumes, communication, fluid mixing, mass residence time distribution etc. Tracers may be injected into the system by a variety of methods, however the most common being either as a sharp pulse (Dirac pulse) or at a constant concentration rate. In several types of well operation there is a need for tracer delivery systems, which are able to release tracers at places where it will, due to practical constrains, be difficult to position or install more conventional mechanical injection equipment. There is also a need for delivery systems that are able to reflect changes in the well conditions such as temperature, single-phase fluid chemical composition or fluid phase types.

Examples of suitable non-radioactive tracers are salts of naphthalenesulfonic acids, salts of amino naphthalenesulfonic acids, fluorescein and fluorinated benzoic acids. $^3$H-labelled or $^{14}$C-labelled tracers of the same kind of components may also be applied.

Application of such release methods has been proposed in several patents with the specific aim to measure fluid inflow in oil production wells (patent US06645769, patent US0582147). Due to the complexity of most oil reservoirs and the modern horizontal, undulating, multilateral or multi-branched production wells it may be difficult to know from which well or zones in the well the fluids are produced. The water production rates in oilfields may in some wells be at a level of 10.000-20.000 m$^3$/d for many years. The tracer release system has to be able to deliver tracer amounts giving a tracer concentration above the detection limit at the downstream detection position. In many situations the available and accessible volume for the delivery system is limited. The system should therefore be able to deliver tracers that are detectable in sub ppb concentrations. This is easily achieved with radioactive tracers (mainly pure beta-emitters). In many systems, however, this should be avoided and the radioactive tracers should be replaced with non-radioactive chemical species.

Optimal oil production from the reservoir depends upon reliable knowledge of the reservoir characteristics. Traditional methods for reservoir monitoring include seismic log interpretation, well pressure testing, production fluid analysis, production history matching and interwell tracer techniques. Due to the complexity of the reservoir all information available is valuable in order to give the operator the best possible knowledge about the dynamics in the reservoir. One common secondary oil recovery process is water injection in dedicated injection wells. The water may travel in different layers and sweep different area in the reservoir. Monitoring of the production of this water in different zones in the well is important to design a production program that improves the sweep efficiency and thereby increased the oil recovery. Mixing of injection water and formation water originally present in the reservoir may cause supersaturated solutions leading to precipitation of particles (scale) in either the reservoir near-well zone or in the production tubing. By knowing which zones contribute to water production, action can be taken to reduce the effect of scaling and thereby maintain productivity.

SUMMARY OF THE INVENTION

The present application proposes a specific tracer delivery system that has been tested. The claimed system is composed of melamine formaldehyde resin (MFR) doped with various tracer materials. The MFR is used to slowly release tracer compounds into a liquid system. The MFR/tracer mixture is applied as part of a monitoring system where tracer is delivered from the MFR/tracer mixture at a specific location upstream and detected at some location downstream, thereby verifying fluid flow from that specific location up-stream. The MFR can be doped with different types of tracers, thereby allowing placement of different tracers at several different positions upstream. Production from the various labelled zones can be verified through the analysis of one sample downstream.

DESCRIPTION OF THE DRAWINGS

FIG. 1 is a simple flow chart depicting the experimental set-up for the tracer release experiment.

FIG. 2 is a graph, which shows the amount of tracer leached per day from the 64 cm$^3$ cube of MFR resin with 10% tracer expressed as per mille of total available amount at the start of the experiment as function of time.

FIG. 3 is a simple flow chart depicting the experimental set-up for tracer release from MFR with formation water flowing through a hole in the resin.

FIG. 4 is a graph, which shows the release rate of tracer from MFR during flow-trough experiment.

DETAILED DESCRIPTION OF THE INVENTION

In other systems, tracers may be added either as a pulse or at a constant delivery rate. The MFR system is developed to work as a stable delivery system at remote sites. The system will in many situations be a cost efficient method for tracer delivery. Once installed, no further maintenance or work is needed to deliver the tracer. The MFR system may work as a delivery system for many years.

The MFR tracer delivery system has been developed to enhance the possibilities for using tracers as a tool to measure fluid flow parameters in a large variety of mass transfer systems. The MFR works as a release system for the tracer compound under high temperature and high pressure conditions. The MFR can be doped with different types of tracers in different concentrations.

The application of MFR includes, but is not limited to, the delivery of water or oil tracers in oil production wells. The MFR system can be placed in a production well in the oil reservoir. The MFR can be placed in the toe, along the production line or in the heel of the production well. Different tracers can be applied at different locations. The system may be placed together with production liner, during workover. The MFR can be an integrated part of production tubing or placed as separate objects. The MFR can be placed in the gravel pack or in a rat hole.

The tracer is mixed into a MFR condensate solution before hardening with a suitable hardener. The condensate solution is commercially available from suppliers such as Dynea ASA, Norway, and is a reaction mixture of melamine, formaldehyde, methanol and water. It may also contain additives such as stabilizers, fillers, plasticizers and/or colorants. The original content before condensation is 25-40% melamine, 25-35% formaldehyde and 1-10% methanol. The hardener can be formic acid or other products from the supplier. One possible product is Prefere 4720 with addition of 10% (w/w) of the hardener Prefere 5020 from Dynea ASA. The condensate solution can also be prepared by mixing dried powder of the condensate with water. The dried powder is available from Dynea ASA or other suppliers and is made by spray drying of a condensate solution with the same original composition of ingredients as listed above. One possible resin powder product is Dynomel M-765 from Dynea ASA. The tracer is mixed into the condensate solution using a mechanical blender before the hardener is mixed in.

Some tracers such as amino naphthalene sulfonic acids and fluorescein will react with formaldehyde and melamine in the condensate solution. The chemical reaction may be enhanced by applying heat. These tracers will be incorporated into the polymer structure after hardening. Tracers may be mechanically distributed as salt crystals in the polymer matrix, be chemically incorporated or a combination of both cases may be possible. The chemically bound tracers may be released through hydrolyses either as the tracer itself or as derivatives of the tracer when the polymer is exposed to water at high temperature. Tracers that are chemically bound will be released at a slower rate than when the tracer is present as salt particles only, something which will extend the lifetime of the tracer source. In cases where a long release period is desirable, this type of chemically bound tracer matrixes may be preferable to others.

Urea formaldehyde resin was also tested as carrier for the water tracers. This resin type was discarded because it was much less stable to water at elevated temperatures.

It is an advantage to make use of water based resins for the water soluble tracers. One reason for this is that the tracers are more easily distributed into a hydrophilic resin than a hydrophobic resin. A more hydrophobic resin like polymethylmethacrylate was also tested as carrier, but it was more difficult to disperse the tracer particles evenly in the resin.

The tracers applied can be radioactive or non radioactive.

The tracer release rate from this MFR/tracer system will depend on the surface and geometry of the MFR exposed to the fluid. The release rate of tracer will further be influenced by parameters such as temperature, fluid composition and pressure. The MFR will tolerate a large fraction (in %) of tracer compound and still maintain acceptable mechanical properties. Typical tracer loading will be 5-20 weight %. A standard temperature/pressure range where the MFR system according to the present invention may be used will be up to 120° C. and 600 bar.

The MFR release system may be shaped to adapt into different geometries suitable for the actual application. This may be rods, cubes, surfaces or direct adaptation to a predefined form. To reinforce the polymer different armouring techniques can be applied.

EXAMPLES

Leaching experiments using naphthalenesulfonic acids have been performed. These compounds constitute a class of chemicals with excellent tracer properties.

Example 1

In the example reported here a MFR cube with a side length of 4 cm has been prepared containing 10% by weight of chemical tracer compound. This experiment has been carried out at a temperature of 90° C. The MFR in this experiment was made from Dynomel M-765.

The cube was placed in a pressure container as shown in FIG. 1. In the example saline water, comparable to what can be expected in an oil reservoir, has been used as the flowing phase. The system allows testing at different temperatures, pressure and flow rates. FIG. 2 provides an example of the measured release rates. The release rate measured was about 0.3%/day of the total tracer amount in the actual cube. The release rate will depend upon the geometry and accessible surface of the MFR system. The obtained release rate shows that the polymer can last for about one year releasing tracer at rates suitable for detection downstream using state-of-the-art analytical methods.

Example 2

The set-up for Example 2 is shown in FIG. 3.

A hole of 3 mm diameter was drilled through a cube of MFR made from Dynomel M-765 with size 20×20×7 mm containing 10% chemical tracer. One length of stainless steel tubing was inserted into the hole from each side of the cube so that only a length of 5 mm of the hole in the resin was exposed to the formation water that was flowing through. The tracer source was placed in a heating oven at 90° C. and the flow rate of formation water was set at 0.5 ml per minute. The measured release rate is shown in FIG. 4.

Both examples show that it is possible to construct tracer sources from MFR doped with chemical tracer that will provide a fairly constant release of tracer over time.

The invention claimed is:

1. A tracer delivery system which comprises of a melamine formaldehyde resin (MFR) polymer wherein the polymer is doped with one or more tracers and the polymer releases tracer after placement in a liquid system; and
   wherein the amount of tracer is about 5-20% by weight based in the total weight of the system and wherein the doping of the polymer comprises of mixing the tracer with a MFR condensate solution comprising of melamine, formaldehyde, methanol and water prior to hardening the solution with a hardener.

2. The system of claim 1, wherein the tracer is a radioactive tracer.

3. The system according to claim 2, wherein the radioactive tracer is $^3H$ or $^{14}C$.

4. The system of claim 1, wherein the tracer is a non-radioactive tracer.

5. The system according to claim 4, wherein the non-radioactive tracer is naphthalenesulphonic acid, amino naphthalenesulphonic acid, fluorinated benzoic acid or salts thereof.

6. The system of claim 1, wherein the system may further comprise fillers, plasticizers, stabilizers and/or colorants.

7. A method of verifying fluid flow of a liquid system which comprises applying a tracer delivery system of claim 1 to an upstream location of the liquid system and detecting the amount of tracer released into the liquid system at a downstream location of the liquid system.

8. The method of claim 7, wherein the tracer delivery system has an amount of tracer is about 5-20% by weight based in the total weight of the system, the tracer is a radioactive tracer which is $^3$H or $^{14}$C and may further comprise fillers, plasticizers, stabilizers and/or colorants.

9. The method of claim 7, wherein the tracer delivery system has an amount of tracer is about 5-20% by weight based in the total weight of the system, the tracer is a non-radioactive tracer which is naphthalenesulphonic acid, amino naphthalenesulphonic acid, fluorinated benzoic acid or salts thereof and may further comprise fillers, plasticizers, stabilizers and/or colorants.

10. The method of claim 7, wherein the polymer releases tracer for up to about one year after placement in a liquid system.

11. A method of verifying fluid flow at multiple locations of a liquid system which comprises applying a tracer delivery system of claim 1 to each desired upstream location of the liquid system and detecting the amount of tracer released into the liquid system at each downstream location the liquid system which corresponds to the respective desired upstream location.

12. The method of claim 11, wherein the tracer delivery system has an amount of tracer is about 5-20% by weight based in the total weight of the system, the tracer is a radioactive tracer which is $^3$H or $^{14}$C and may further comprise fillers, plasticizers, stabilizers and/or colorants.

13. The method of claim 11, wherein the tracer delivery system has an amount of tracer is about 5-20% by weight based in the total weight of the system, the tracer is a non-radioactive tracer which is naphthalenesulphonic acid, amino naphthalenesulphonic acid, fluorinated benzoic acid or salts thereof and may further comprise fillers, plasticizers, stabilizers and/or colorants.

14. The method of claim 11, wherein the polymer releases tracer for up to about one year after placement in a liquid system.

* * * * *